(12) United States Patent
Harada et al.

(10) Patent No.: US 10,892,517 B2
(45) Date of Patent: Jan. 12, 2021

(54) SOLID ELECTROLYTE, MANUFACTURING METHOD OF SOLID ELECTROLYTE, BATTERY AND BATTERY PACK

(71) Applicant: KABUSHIKI KAISHA TOSHIBA, Tokyo (JP)

(72) Inventors: Yasuhiro Harada, Yokohama (JP); Norio Takami, Yokohama (JP); Hiroki Inagaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/923,567

(22) Filed: Jul. 8, 2020

(65) Prior Publication Data

US 2020/0343584 A1 Oct. 29, 2020

Related U.S. Application Data (60) Division of application No. 14/202,539, filed on Mar. 10, 2014, which is a continuation of application No. PCT/JP2012/057539, filed on Mar. 23, 2012.

(51) Int. Cl.
*H01M 10/0562* (2010.01)
*H01B 1/08* (2006.01)
(Continued)

(52) U.S. Cl.
CPC ......... *H01M 10/0562* (2013.01); *B32B 18/00* (2013.01); *C01G 23/005* (2013.01); *C01G 25/006* (2013.01); *C04B 35/01* (2013.01); *C04B 35/462* (2013.01); *C04B 35/486* (2013.01); *C04B 35/62685* (2013.01); *C04B 35/645* (2013.01); *H01B 1/08* (2013.01);
(Continued)

(58) Field of Classification Search
CPC .. H01M 10/0562; C04B 35/01; C04B 35/462; C04B 35/645
USPC .......................................... 429/304
See application file for complete search history.

(56) References Cited

U.S. PATENT DOCUMENTS

| 6,254,844 B1 | 7/2001 | Takeuchi et al. |
| 6,994,807 B2 | 2/2006 | Tanner |

(Continued)

FOREIGN PATENT DOCUMENTS

| JP | 11-199327 | 7/1999 |
| JP | 2000-109360 A | 4/2000 |

(Continued)

OTHER PUBLICATIONS

Rajeswari et al. Effect of nano-grain size on the ionic conductivity of spark plasma sintered 8YSZ electrolyte. Int. Journal of Hydrogen Energy, vol. 37, Issue 1, 2012, pp. 511-517. Retrieved from <URL: https://www.sciencedirect.com/science/article/pii/S0360319911020970> (Year: 2012).*

(Continued)

*Primary Examiner* — James M Erwin
(74) *Attorney, Agent, or Firm* — Ohlandt, Greeley, Ruggiero & Perle, L.L.P.

(57) ABSTRACT

According to one embodiment, a solid electrolyte includes a sintered body of ceramic grains. The sintered body includes a crystal plane having an ion conducting path. The crystal plane is oriented in a direction which intersects at least one surface of the solid electrolyte.

10 Claims, 3 Drawing Sheets

(51) Int. Cl.
C04B 35/645 (2006.01)
C04B 35/486 (2006.01)
C01G 23/00 (2006.01)
B32B 18/00 (2006.01)
C04B 35/626 (2006.01)
C04B 35/462 (2006.01)
C04B 35/01 (2006.01)
C01G 25/00 (2006.01)

(52) U.S. Cl.
CPC ...... C01P 2002/34 (2013.01); C01P 2006/40 (2013.01); C04B 2235/3203 (2013.01); C04B 2235/3227 (2013.01); C04B 2235/3234 (2013.01); C04B 2235/3248 (2013.01); C04B 2235/3275 (2013.01); C04B 2235/764 (2013.01); C04B 2235/768 (2013.01); C04B 2235/787 (2013.01); C04B 2237/34 (2013.01); C04B 2237/346 (2013.01); C04B 2237/348 (2013.01); H01M 2300/0071 (2013.01)

(56) References Cited

U.S. PATENT DOCUMENTS

2009/0226790 A1 9/2009 Kanamura
2011/0081598 A1 4/2011 Park
2011/0294021 A1 12/2011 Suto

FOREIGN PATENT DOCUMENTS

| JP | 2000-143330 A | 5/2000 |
| JP | 2002-042549 A | 2/2002 |
| JP | 2002-042550 A | 2/2002 |
| JP | 2004-131363 A | 4/2004 |
| JP | 2008-10411 A | 1/2008 |
| JP | 2009-181807 A | 8/2009 |
| JP | 2010-132972 A | 6/2010 |
| JP | 2010-212003 A | 9/2010 |
| JP | 2011-124079 A | 6/2011 |

OTHER PUBLICATIONS

Aalund, Robert; "SPARK Plasma Sintering", Ceramic Industry Magazine, May 2008, 4 pages.

Abe et al.; "Lithium IOn Transfer at the Interface between Lithium-Ion-Conductive Solid Crystalline Electrolyte and Polymer Electrolyte"; J. Electrochem. Soc. vol. 151(11), 2004, pp. A1950-A1953 [online]. Retrieved on Oct. 24, 2019 from ,URL: http://jes.ecsdl.org/content/151/11/A1950.full.pdf> (Year: 2004).

Adams et al.; "Ultrafast Lithium Migration by hetergeneous doping in surface modified LixFePO4"; ECS Transactions, vol. 28, Issue 11, 2010, pp. 277-285 [online], [retrieved on Sep. 12, 2017]. Retrieved from the Internet <URL: http://ecst.ecsdl.org/content/28/11/277.full.pdf+html> (Year: 2010).

Anantharamulu et al.; "A wide-ranging review on Nascion type materials"; J Mater Sci., vol. 46, 2011, pp. 2821-2837 [online], [retrieved on Sep. 12, 2017]. Retrieved from the Internet <URL: https://link.springer.com/article/10.1007/s10853-011-5302-5> (Year: 2011).

Kotobuki et al.; "Compatability of Li7La3Zr2O12 Solid Electrolyte to All-Solid-State Battery Using Li Metal Anode"; J. Electrochem. Soc. vol. 157(10), 2010, pp. A1076-A1079 [online]. Retrieved on Oct. 24, 2019 from <URL: http://jes.ecsdl.org/content/157/10/A1076.full.pdf> (Year: 2010).

Wang et al.; "Ionic Conductivity of $Li_{1\_x}Ti2(PO4)3 (0.2<x<1.72)$ with Nasicon-Related Structures"; Chem. Mater., vol. 5, 1993, pp. 23-26 {online], [retrieved on Aug. 4, 2016]. Retrieved from the Internet <URL: http://pubs.acs.org/doi/pdf/10,1021/cm00025a008>.

Xu et al.; "Dense nanostructured solid electrolyte with high Li-ion conductivity by spark plasma sintering technique"; Materials Research Bulletin, vol. 43, 2008, pp. 2334-2341 {online], [retrieved on Apr. 20, 2019]. Retrieved from <URL: https://www.sciencedirect.com/science/article/pii/S0025540807003662> (Year: 2008).

International Search Report dated May 29, 2012 from corresponding PCT/JP2012/057539, 9 pages.

Written Opinion dated May 29, 2012 from corresponding PCT/JP2012/057539, 6 pages.

International Preliminary Report on Patentability dated Oct. 2, 2014from corresponding PCT/JP2012/057539, 8 pages.

Japanese Notice of Reasons for Refusal dated Dec. 16, 2014 from corresponding Japanese Application No. 2014-505934, 4 pages.

Japanese Final Notice of Reasons for Refusal dated Mar. 17, 2015 from corresponding Japanese Application No. 2014-505934, 5 pages.

Japanese Notice of Reasons for Refusal dated Nov. 17, 2015 from corresponding Japanese Application No. 2014-505934, 6 pages.

Japanese Office Action dated Mar. 8, 2016 from corresponding Japanese Application No. 2015-101066, 4 pages.

* cited by examiner

FIG. 5

SOLID ELECTROLYTE, MANUFACTURING METHOD OF SOLID ELECTROLYTE, BATTERY AND BATTERY PACK

CROSS-REFERENCE TO RELATED APPLICATIONS

This application is a divisional application of U.S. patent application Ser. No. 14/202,539, filed on Mar. 10, 2014, which is a continuation application of PCT Application No. PCT/JP2012/057539, filed Mar. 23, 2012, the contents of both which are incorporated by reference herein in their entirety.

FIELD

Embodiments of the present invention relate to a solid electrolyte, a manufacturing method of the solid electrolyte, a battery and a battery pack.

BACKGROUND

In recent years, a lithium-ion secondary battery with high energy density has attracted significant attention in areas ranging from a small electronic device to a hybrid vehicle and an electric vehicle as a stationary power source for power storage. Above all, much anticipation surrounds use of the lithium-ion secondary battery with an inorganic solid electrolyte as a safe battery because there is no concern about liquid spills or gas generation that may occur in an organic electrolytic solution. In addition, when a lithium battery using a solid electrolyte is compared to a battery using an electrolytic solution, a longer cycle life is also expected because a side reaction other than a battery reaction occurs with lower possibility. Furthermore, in an all-solid-state battery using an inorganic solid electrolyte, since a configuration in which an electrode and an electrolyte layer are laminated is easily obtained, the reduction of manufacturing cost and the configuration of a bipolar-type battery can be simultaneously achieved. Accordingly, a higher energy density can be expected when compared to a battery using a liquid electrolyte.

However, one problematic issue when an all-solid-state battery is constructed is that the motion of lithium ions in a solid electrolyte is restricted, unlike within a liquid electrolyte. Specifically, whereas Li-ions can diffuse three-dimensionally in a liquid, they do not necessarily diffuse three-dimensionally in a solid because diffusion depends on the structure of a crystal, and diffusion occurs two-dimensionally or one-dimensionally when the crystal has a layer structure or a tunnel structure. For this reason, in a bulk-state solid electrolyte, since diffusion occurs in various directions in an electrode due to the existence of grain boundaries, the diffusion velocity of lithium ions decreases, causing a problem that Li-ion conductivity is low. In view of these problems, there has been proposed an idea by which an ion-conductive compound, which is obtained by hydrolyzing a silicon compound, is given orientation by performing a treatment in a magnetic field. A treatment in a magnetic field like this is a means for controlling the crystal orientation, and although some effects are anticipated to be realized for a thin film, it is difficult to apply this treatment to a solid electrolyte consisting of bulk particles, because the effect of a magnetic field is small in a polycrystalline substance consisting of a sintered body. In order to improve ion conduction in particular, it is necessary to grow a crystal while moving conductive ions in the structure of a crystal.

In an all-solid-state battery, it has been practiced that the c-axis of the single crystal of a lithium-ion conductor obtained by film production is oriented in a direction perpendicular to a substrate (orthogonal to a positive electrode layer and a negative electrode layer). However, this method has a high manufacturing cost. In order to produce a high-performance all-solid-state battery inexpensively, a technique is required by which a crystal plane is strongly oriented such that lithium ion conduction occurs easily for a solid electrolyte consisting of the polycrystalline substance of ceramic grains.

DETAILED DESCRIPTION

According to one embodiment, there is provided a solid electrolyte including a sintered body of ceramic grains. The sintered body includes a crystal plane having an ion conducting path. The crystal plane is oriented in a direction which intersects at least one surface of the solid electrolyte.

According to the embodiment, a battery includes a positive electrode, a negative electrode and a solid electrolyte. The solid electrolyte is provided between the positive electrode and the negative electrode. The solid electrolyte includes a ceramic-grain sintered body. The ceramic-grain sintered body includes a crystal plane having an ion conducting path. The crystal plane is oriented in a direction which intersects the positive electrode and the negative electrode.

According to the embodiment, there is provided a battery pack including the battery.

According to the embodiment, there is provided a manufacturing method of solid electrolyte. The method includes applying an alternating electric field in a direction which intersects at least one surface of a solid electrolyte precursor while heating the solid electrolyte precursor. The solid electrolyte precursor includes a ceramic-grain sintered body. The ceramic-grain sintered body includes a crystal plane having an ion conducting path.

A description will be made below with reference to the drawings of the embodiments.

First Embodiment

According to a first embodiment, there is provided a solid electrolyte including the sintered body of ceramic grains. The solid electrolyte including the sintered body of ceramic grains can be synthesized by an inexpensive method, and many are configured by a particulate sintered body in which ceramic particulates are connected with each other by necking. The arrangement of ceramic grains and further a domain structure in a crystal greatly affects ion conduction. Many solid electrolytes including sintered bodies of ceramic grains are inferior to an electrolytic solution in ion conduction. One reason for this, other than the resistance between grains (grain boundary resistance), is the decrease in conduction due to the fact that the directions of conducting channels between grains constituting a solid electrolyte are not aligned.

Figure 1A:
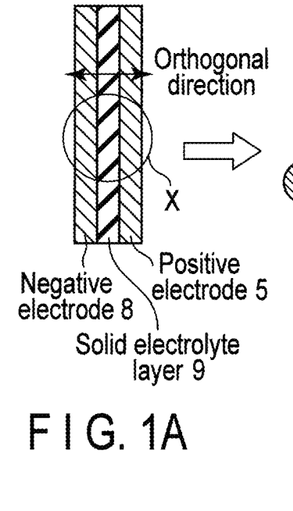
FIG. 1A is a schematic view showing an example of the ion diffusion of a solid electrolyte according to a first embodiment.
Figure 1B:
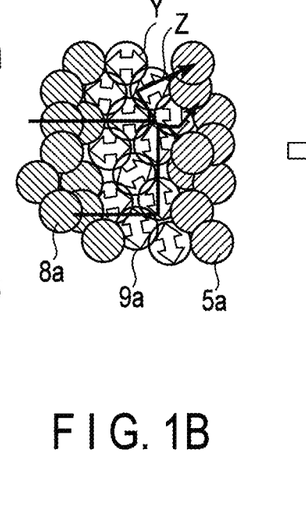
FIG. 1B is a schematic view showing an example of the ion diffusion of a solid electrolyte according to a first embodiment.

FIG. 1A is a cross-sectional view showing a laminated body in which a solid electrolyte layer 9 is arranged between a positive electrode 5 and a negative electrode 8. FIG. 1B is a schematic view where the X portion of the laminated body of FIG. 1A is expanded. There exists a ceramic-grain sintered body 9a of the solid electrolyte layer 9 between the negative electrode active material grains 8a of the negative electrode 8 and the positive electrode active material grains 5a of the positive electrode 5. As shown in FIG. 1B, when the direction Y of the conducting path of the ceramic-grain sintered body 9a is random, an ion diffusion distance Z becomes long, and so ion conduction is poor.

Figure 1C:
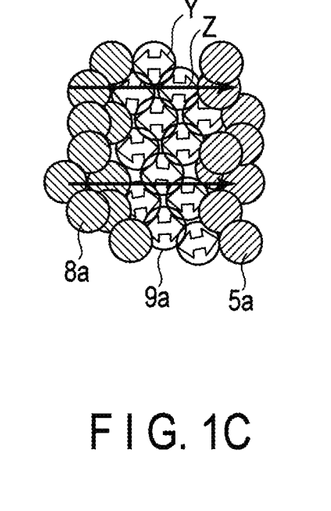
FIG. 1C is a schematic view showing an example of the ion diffusion of a solid electrolyte according to a first embodiment.

Accordingly, in the first embodiment, a ceramic-grain sintered body has a crystal plane having an ion conducting path oriented in a direction so that the crystal plane may intersect (for example, may be orthogonal to) at least one surface of the solid electrolyte. Consequently, as illustrated in FIG. 1C, since the direction Y of the conducting path of the ceramic-grain sintered body 9a can be aligned, the ion diffusion distance Z can be shortened. This enables smooth ion diffusion even in a bulk-state solid electrolyte including the sintered body of ceramic grains. By joining an electrode to the surface of this solid electrolyte, improvement in the charge-and-discharge rate performance of a battery can be expected. Although the crystal plane is oriented in a direction so that it may intersect both surfaces of the solid electrolyte in FIG. 1C, the crystal plane may be oriented in a direction so that it may intersect only one surface of the solid electrolyte. In the case of one surface, it is desirable that the crystal plane is oriented in a direction so that it may intersect the surface which an electrode contacts.

Desirably, the solid electrolyte has an ion conducting path in a direction so that the ion conducting path may intersect at an angle in a range of not more than 30° (0° included) with respect to the perpendicular of at least one surface of the solid electrolyte. Here, when an angle turning 30° in one direction from the perpendicular is assumed as +30°, the angle of 30° from the perpendicular includes an angle turning 30° (−30°) in a counter direction from the perpendicular (±30° included). More desirably, the solid electrolyte has an ion conducting path in a direction or has a crystal plane oriented in the direction so that the ion conducting path or the crystal plane may perpendicularly intersect the surface in question.

It is desirable that the ceramic-grain sintered body has lithium-ion conduction. A ceramic with lithium-ion conduction includes a perovskite-type oxide and a garnet-type oxide.

It is preferable that the ion conducting path of the ceramic-grain sintered body is a linear one-dimensional channel or a planar two-dimensional channel. The reason for this is that an expected effect (improvement in ion conduction) brought about by orienting a crystal plane is obtained more easily when the ion conducting path is a one-dimensional or a two-dimensional channel.

A crystal plane having the ion conducting path includes (n00), (0n0), (00n), (0nn), (nnn), etc. Here, n is a natural number.

According to the solid electrolyte of the first embodiment described above, since the ceramic-grain sintered body includes a crystal plane having an ion conducting path and an orientation of the crystal plane may intersect at least one surface of the solid electrolyte, the direction of the ion conducting path that plays a role of charge transfer in the solid electrolyte can be aligned. Consequently, since smooth ion diffusion is possible even in a bulk-state solid electrolyte including the sintered body of ceramic grains, there can be provided a solid electrolyte which exhibits high ion conduction.

Second Embodiment

According to a second embodiment, there can be provided a method for manufacturing the solid electrolyte according to the first embodiment. This method includes a process in which an alternating electric field is applied in a direction so that it may intersect at least one surface of a solid electrolyte precursor while heating the solid electrolyte precursor including a ceramic-grain sintered body. With this process, a solid electrolyte including the ceramic-grain sintered body can be obtained, in which a crystal plane having an ion conducting path is oriented in a direction so that the crystal plane may intersect at least one surface of the solid electrolyte.

Although the kind and synthesizing method of a solid electrolyte are not limited in particular, a solid reaction method is mentioned as one synthesizing method. As raw materials of solid reaction, an oxide containing a constituent element and various salt compounds such as a carbonate, a nitrate or the like, from which constituent elements are generated by heating, can be used. By mixing and sintering these so as to obtain a target composition, the solid reaction can be completed. This method is preferable because of its low cost.

A solid electrolyte precursor can also be synthesized by a solution method (sol-gel method). A metal alkoxide containing a target constituent element is used as a raw material, and a water-soluble salt containing other additive elements is also used as the raw material. By adding these while stirring sufficiently, a gel mixture is obtained. The obtained gel mixture is heated and dried at around 90 to 120° C. By sintering this powder at 450 to 1000° C., a target compound can be obtained. At this time, when the sintering temperature is lower than 450° C., reactivity is poor, and also an organic constituent contained in the raw material is not decomposed and remains in the structure, which is not preferable. When the sintering temperature exceeds 1000° C., part of the constituent transpires with high possibility, and a resultant composition tends to deviate from a target one. Thus, since a target product material can be obtained via low temperature sintering by using the sol-gel method, there is little evaporation of constituent elements, and further, grain growth can be suppressed, both of which are preferable.

Figure 2:
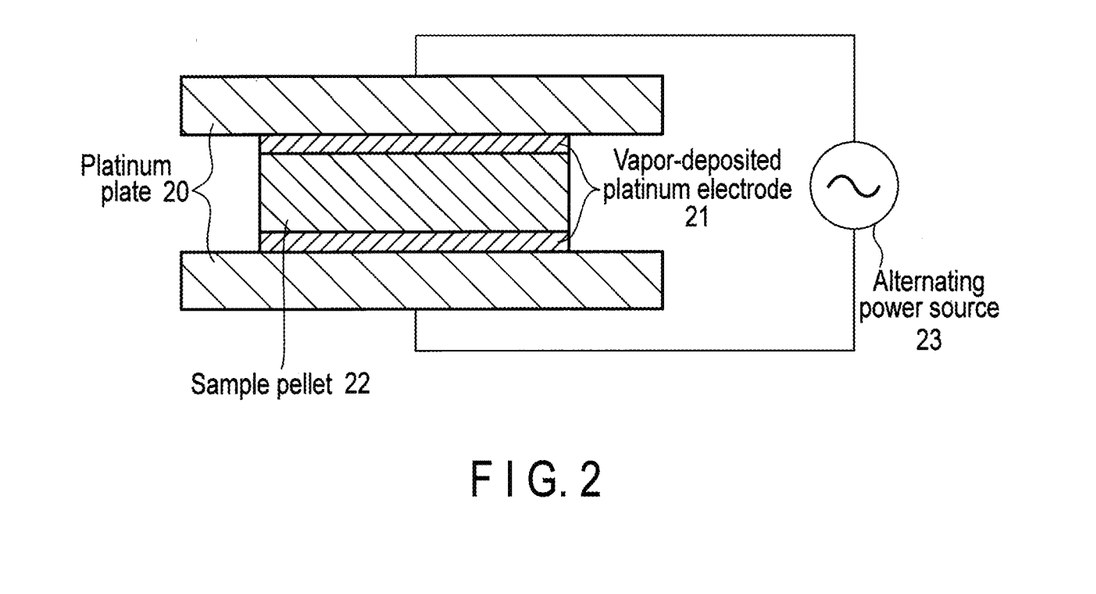
FIG. 2 is a schematic view of an electric field applying apparatus used in a method according to a second embodiment.

In order to orient a crystal plane having an ion conducting path, which plays a role of the charge transfer of a solid electrolyte, in a direction so that the crystal plane may intersect at least one surface of the solid electrolyte, an alternating electric field is applied to at least one surface of a solid electrolyte precursor. With this process, a conducting path which is able to intersect at least one surface of the solid electrolyte can be formed. Specifically, when the solid electrolyte precursor is sintered, an alternating electric field is applied from the outside. An example of this is shown in FIG. 2. First, a platinum electrode 21 is formed on both surfaces of a pellet-type solid electrolyte precursor (sample pellet) 22 by vapor deposition. With this sample pellet sandwiched between two platinum plates 20, the solid electrolyte precursor 22 is sintered while an alternating electric field is being applied between the platinum plates 20 by an alternating power source 23. With this process, conductive ion species oscillate (come and go) along the direction of the electric field in the crystal of particulates which constitute the solid electrolyte. Since crystal growth proceeds in the course of sintering, the crystal grows in a direction so that ions may come and go easily, and anisotropy arises as a result. Consequently, a path (route) can be formed, through which ions conduct easily in a direction connecting both surfaces (for example, the perpendicular direction connecting a positive electrode and a negative electrode). In a solid electrolyte including the sintered body of ceramic particulates, a high orientation like this has previously not been obtained by applying a magnetic field, and was obtained for the first time by the method of the second embodiment. By changing an applied electric field and a frequency according to the thickness of a solid electrolyte and conducting ion species, a more optimal orientation can be obtained. For example, in the case of a lithium-ion-conducting oxide, it is appropriate to apply a voltage of about 0.1 V to 5.0 V, which is a condition under which constituent elements are not easily oxidized or reduced, with a frequency of about 10 mHz to 10 MHz. When the voltage is higher than 5 V, elements that constitute the oxide are decomposed with a high possibility due to oxidation/reduction, which is unpreferable. When the voltage is smaller than 0.1 V, an expected effect is not easily obtained due to grain boundary resistance, which is also unpreferable. When the frequency is less than 10 mHz, orientation is not easily obtained because the amplitude of a conducting ion is large; when the frequency is larger than 10 MHz, the amplitude of the conducting ion is too small, and so a conducting path oriented within a grain strongly tends to be short, which is unpreferable.

The platinum electrodes 21 formed by vapor deposition on both surfaces of the solid electrolyte are removed by a polishing treatment, etc.

According to the manufacturing method of the solid electrolyte of the second embodiment described above, a process is included, in which an alternating electric field is applied in a direction so that it may intersect at least one surface of a solid electrolyte precursor while heating the solid electrolyte precursor including a ceramic-grain sintered body. With this process, since the solid electrolyte includes a crystal plane having an ion conducting path and an orientation of the crystal plane may intersect at least one surface of the solid electrolyte, there can be provided the solid electrolyte with improved ionic conduction.

Third Embodiment

According to a third embodiment, there can be provided a battery which uses an electrolyte layer including the solid electrolyte according to the first embodiment. The battery further includes a positive electrode including a positive electrode active material and a negative electrode including a negative electrode active material. The electrolyte layer includes a ceramic-grain sintered body including a crystal plane having an ion conducting path. The orientation of the crystal plane may intersect both surfaces of the electrolyte layer. Since the positive electrode is joined to one surface of the electrolyte layer and the negative electrode is joined to the other surface of the electrolyte layer, the orientation of the crystal plane may intersect the positive electrode and the negative electrode.

Description will be made in detail below about the electrolyte layer, the positive electrode, the negative electrode, a nonaqueous electrolyte and a case.

1) Electrolyte Layer

Although the electrolyte layer may substantially consist of the solid electrolyte according to the first embodiment, in order to reduce a contact area further, it may include a nonaqueous electrolyte, a polymer (polymer material) electrolyte or a room-temperature-molten-salt material.

The nonaqueous electrolyte includes a liquid nonaqueous electrolyte prepared by dissolving an electrolyte in an organic solvent, a gel nonaqueous electrolyte obtained by compounding a liquid electrolyte and a polymer material, etc.

The liquid nonaqueous electrolyte is prepared by dissolving an electrolyte in an organic solvent at the concentration of 0.5 mol/L or more and of 2.5 mol/L or less, for example. As the electrolyte, for example, a lithium salt such as lithium perchlorate ($LiClO_4$), lithium hexafluorophosphate ($LiPF_6$), lithium tetrafluoroborate ($LiBF_4$), lithium hexafluoroarsenic ($LiAsF_6$), trifluoro meta-sulfonic acid lithium ($LiCF_3SO_3$) and bistrifluoromethylsulfonyl imide lithium [$LiN(CF_3SO_2)_2$], or a mixture of the above can be mentioned. It is preferable that the electrolyte is not easily oxidized even under a high electric potential, and $LiPF_6$ is most preferable. As the organic solvent, for example, a cyclic carbonate such as propylene carbonate (PC), ethylene carbonate (EC), vinylene carbonate, etc., chain carbonate such as diethyl carbonate (DEC), dimethyl carbonate (DMC), methylethyl carbonate (MEC), etc., cyclic ether such as tetrahydrofuran (THF), 2-methyl tetrahydrofuran (2MeTHF), dioxolane (DOX), etc., chain ether such as dimethoxyethane (DME), diethoxy ethane (DEE), etc., a single or mixed solvent such as γ-butyrolactone (GBL), acetonitrile (AN), sulfolane (SL), etc. can be mentioned.

As the polymer material, for example, polyvinylidene fluoride (PVdF), polyacrylonitrile (PAN), polyethylene oxide (PEO), etc. can be mentioned.

A room-temperature molten salt (ionic liquid) is a compound which can exist as a liquid at room temperature (15 to 25° C.) among organic salts consisting of the combination of an organic matter cation and anion. As the room-temperature molten salt, a room-temperature molten salt which exists as a liquid alone, a room-temperature molten salt which becomes a liquid by being mixed with an electrolyte, a room-temperature molten salt which becomes a liquid by being dissolved in an organic solvent, etc. are mentioned. Generally, the melting point of a room-temperature molten salt used for a nonaqueous electrolyte battery is 25° C. or less. The organic matter cation generally has a quaternary ammonium frame.

The solid polymer electrolyte is obtained by dissolving an electrolyte in a polymer material and solidifying it.

2) Negative Electrode

The negative electrode has a negative electrode current collector and a negative electrode material layer (negative electrode active material containing layer) which is supported on one surface or both surfaces of the negative electrode current collector and which includes a negative electrode active material, conducting agent, if necessary, a binder, etc. It is desirable that the conducting agent is blended in order to improve collecting performance and to suppress contact resistance resulting from contact with the current collector.

The negative electrode active material may just be a chargeable and dischargeable material for a lithium ion among lithium metal, carbon, an oxide, a sulfide, etc., although there is no restriction in particular.

As an example of the oxide, a titanium containing oxide is mentioned. The titanium containing oxide includes, for example, a titanium system oxide which does not contain lithium at the time of synthesis of the oxide, a lithium titanium oxide, a lithium titanium complex oxide in which part of the constituent elements of a lithium titanium oxide is substituted by a different species element, etc. As the lithium titanium oxide, for example, a lithium titanate having a spinel structure (for example, $Li_{4+x}Ti_5O_{12}$ ($0 \le x \le 3$)), a ramsdellite-type lithium titanate (for example, $Li_{2+y}Ti_3O_7$ ($0 \le y \le 3$)), etc. can be mentioned. As the titanium system oxide, $TiO_2$, a metal complex oxide containing Ti and at least one element selected from the group consisting of V, Sn, Cu, Ni, Co and Fe, etc. are mentioned. In the $TiO_2$, a compound having a monoclinic system β-type structure ($TiO_2$ (B)), a compound having an anatase-type structure and a compound having a rutile-type structure are included.

In the sulfide, for example a titanium system sulfide such as $TiS_2$ etc., for example a molybdenum system sulfide such as $MoS_2$ etc., and for example a ferrous system sulfide such as FeS, $FeS_2$, $Li_xFeS_2$ ($0 \le x < 4$), etc. are included.

As the conducting agent, for example, a carbonaceous material such as acetylene black, carbon black and graphite can be mentioned.

As the binder, for example, polytetrafluoroethylene (PTFE), polyvinylidene fluoride (PVdF), fluorine system rubber, styrene-butadiene rubber, etc. are mentioned.

It is preferable that the binder is blended in the range of 2 mass percent or more and 30 mass percent or less in the negative electrode material layer. By selecting a binder amount of 2 mass percent or more, the binding property between the negative electrode material layer and the current collector can be enhanced. On the other hand, from the viewpoint of increasing capacity, it is preferable that the amount of the binder is 30 mass percent or less. It is preferable that the conducting agent is also blended in the negative electrode material at the ratio of 30 mass percent or less.

As the current collector, a material is used which is electrochemically stable at the absorption/release electric potential of lithium in the negative electrode active material. It is preferable that the current collector is made of copper, nickel, stainless steel or aluminum. It is preferable that the thickness of the current collector is 0.1 to 20 μm. The current collector having such a thickness can balance the strength and the weight saving of the negative electrode. In the case of an all-solid-state battery that includes a solid electrolyte, it is desirable that a metal is formed by sputtering or vapor deposition as the current collector.

The negative electrode may include a solid electrolyte of a different kind than that according to the first embodiment.

The negative electrode is produced, for example, as follows: a slurry is prepared by suspending the negative electrode active material, the powder of the solid electrolyte, the binder and the conducting agent in a solvent; with this slurry coated on the current collector and dried, the negative electrode material layer is formed, which then undergoes a press process.

Another method for producing the negative electrode is as follows: the negative electrode active material, the powder of the solid electrolyte and the conducting agent are formed in a pellet form, and an obtained pellet is used as the negative electrode layer.

In order to decrease a contact area, the negative electrode may include a nonaqueous electrolyte, a polymer electrolyte (polymer material) or a room-temperature-molten-salt material.

3) Positive Electrode

The positive electrode has a current collector and a positive electrode material layer (positive electrode active material containing layer) which is supported on one surface or both surfaces of this current collector and which includes a positive electrode active material and a binder.

The positive electrode active material includes an oxide and a sulfide. As the positive electrode active material, for example, a manganese dioxide ($MnO_2$) which is able to absorb lithium, a ferrous oxide which is able to absorb lithium, a copper oxide which is able to absorb lithium, a nickel oxide which is able to absorb lithium, a lithium manganese complex oxide (for example, $Li_xMn_2O_4$ or $Li_xMnO_2$), a lithium nickel complex oxide (for example, $Li_xNiO_2$), a lithium cobalt complex oxide (for example, $Li_xCoO_2$), a lithium nickel cobalt complex oxide (for example, $LiNi_{1-y}Co_yO_2$), a lithium manganese cobalt complex oxide (for example, $Li_xMn_yCo_{1-y}O_2$), a spinel-type lithium manganese nickel complex oxide (for example, $Li_xMn_{2-y}Ni_yO_4$), a lithium phosphorus oxide which has an olivine structure (for example, $Li_xFePO_4$, $Li_xFe_{1-y}Mn_yPO_4$, $Li_xCoPO_4$, etc.), a ferrous sulfate [for example, $Fe_2(SO_4)_3$], a vanadium oxide (for example, $V_2O_5$), etc. are mentioned. Here, x and y are in the range of 0 to 1.

As the positive electrode active material with which a high positive electrode voltage is obtained, a lithium manganese complex oxide ($Li_xMn_2O_4$), a lithium nickel complex oxide ($Li_xNiO_2$), a lithium cobalt complex oxide ($Li_xCoO_2$), a lithium nickel cobalt complex oxide ($LiNi_{1-y}Co_yO_2$), a spinel-type lithium manganese nickel complex oxide ($Li_xMn_{2-y}Ni_yO_4$), a lithium manganese cobalt complex oxide ($Li_xMn_yCo_{1-y}O_2$), a lithium iron phosphate ($Li_xFePO_4$), a lithium nickel cobalt manganese complex oxide, etc. are mentioned. Here, x and y are in the range of 0 to 1.

When using a room-temperature molten salt, it is preferable to use a lithium iron phosphate, $Li_xVPO_4F$, a lithium manganese complex oxide, a lithium nickel complex oxide, and a lithium nickel cobalt complex oxide from the viewpoint of cycle life. This is because a reactivity between the positive electrode active material and the room-temperature molten salt decreases. It is preferable that the primary grain size of the positive electrode active material is 100 nm or more and 1 μm or less. It is easy to handle the positive electrode active material with the primary grain size of 100 nm or more for the reason of industrial production. The positive electrode active material with the primary grain size of 1 μm or less enables a lithium ion to smoothly diffused in a solid.

It is preferable that the specific surface area of the positive electrode active material is 0.1 $m^2$/g or more and 10 $m^2$/g or less. The positive electrode active material having the specific surface area of 0.1 $m^2$/g or more can fully ensure the absorption/release site of a lithium ion. The positive electrode active material having the specific surface area of 10 $m^2$/g or less is easy to be handled in the industrial production and can ensure a good charge/discharge cycle performance.

As the binder for the purpose of binding the positive electrode active material and the current collector, for example, polytetrafluoroethylene (PTFE), polyvinylidene fluoride (PVdF), fluorine system rubber, etc. are mentioned.

In order to improve collecting performance and to suppress contact resistance resulting from contact with the current collector, a conducting agent can be blended, if necessary. As the conducting agent, for example, a carbonaceous material such as acetylene black, carbon black and graphite can be mentioned.

As for the blending ratio of the positive electrode active material and the binder, a preferable range is that the amount of the positive electrode active material is 80 mass percent or more and 98 mass percent or less and that the amount of the binder is 2 mass percent or more and 20 mass percent or less. With the amount of the binder selected to be 2 mass percent or more, a sufficient electrode strength can be obtained; with the amount of the binder selected to be 20 mass percent or less, the blending amount of the insulator of an electrode is decreased, and so internal resistance can be decreased.

When the conducting agent is added, with an additive amount selected to be 3 mass percent or more, the effect of adding the conducting agent is obtained; with an additive amount selected to be 15 mass percent or less, the decomposition of a nonaqueous electrolyte on the surface of the positive electrode conducting agent can be suppressed under high temperature.

The positive electrode may include a solid electrolyte of a different kind from that according to the first embodiment.

The positive electrode is produced, for example, as follows: a slurry is prepared by suspending the positive electrode active material, the powder of the solid electrolyte, the binder and the conducting agent, the latter two of which are blended if necessary, in an appropriate solvent; with this slurry coated on the positive electrode current collector and dried, the positive electrode material layer is formed and then a press is performed.

Another method for producing the positive electrode is as follows: the positive electrode active material, the powder of the solid electrolyte, the conducting agent and the binding, the latter two of which are used if necessary, are mixed and then formed in a pellet form, and an obtained pellet is used as the positive electrode layer.

It is preferable that the positive electrode current collector is an aluminum foil or an aluminum alloy foil. It is desirable that the thickness of the aluminum foil or the aluminum alloy foil is 0.1 µm or more and 20 µm or less, more preferably 15 µm or less. It is preferable that the purity of the aluminum foil is 99 mass percent or more. It is preferable that the aluminum alloy is an alloy which includes an element such as magnesium, zinc, silicon, etc. It is preferable that the content of a transition metal such as iron, copper, nickel, chromium, etc., which is contained in the aluminum foil or the aluminum alloy foil, is 1 mass percent or less. In the case of an all-solid-state battery that includes a solid electrolyte, it is desirable that a metal is formed by sputtering or vapor deposition as the current collector.

In order to decrease a contact area, the positive electrode may include a nonaqueous electrolyte, a polymer electrolyte (polymer material) or a room-temperature-molten-salt material.

4) Case

When a nonaqueous electrolyte is used in addition to the solid electrolyte, as the case, a laminate film case with the thickness of 0.5 mm or less or a metal container with the thickness of 1.0 mm or less is used.

It is more preferable that the thickness of the metal container is 0.5 mm or less. Furthermore, in the case of an all-solid-state battery including the solid electrolyte, it is preferable that a mold material is used as the case.

As the shape of the case, a flat type (thin type), rectangular type, cylindrical type, coin type, button type, etc. are mentioned. As for the case, according to the dimensions of a battery, for example, a case for a small-sized battery which is mounted on a portable electronic device, etc., and a case for a large-sized battery which is mounted on a motor vehicle with two wheels to four wheels, etc., are mentioned.

As the laminate film, a multilayer film is used, in which a metal layer is provided between resin films. As the metal layer, it is preferable to use an aluminum foil or an aluminum alloy foil to save weight. As the resin films, for example, a polymer material such as polypropylene (PP), polyethylene (PE), nylon, polyethylene terephthalate (PET), etc. can be used. With a sealing performed by heat-sealing, the laminate film is formed into the shape of the case.

The metal container is made of aluminum or aluminum alloy. It is preferable that the aluminum alloy contains an element such as magnesium, zinc, silicon, etc. In the aluminum or the aluminum alloy, it is preferable that the content of transition metal such as iron, copper, nickel, chromium, etc. is 100 mass ppm or less.

The mold material includes a cresol-novolak-type epoxy resin (ECN), a biphenyl-type epoxy resin, or a resin mold material made of fused silica filler. In addition to these, a polyfunctional mold resin which has a high glass-transition temperature and high crosslink density, a biphenyl-based or highly-functional-polymer-based mold resin which is lead-free and halogen-free, etc. are also available. On the other hand, in the case of a large-sized high-capacity solid-state battery, a ceramic/glass-system mold material can be used in consideration of the influence of the generation of heat, etc. A mold material commonly used in a semiconductor field and which is excellent in insulation and heat resistance can also be used.

Figure 3:
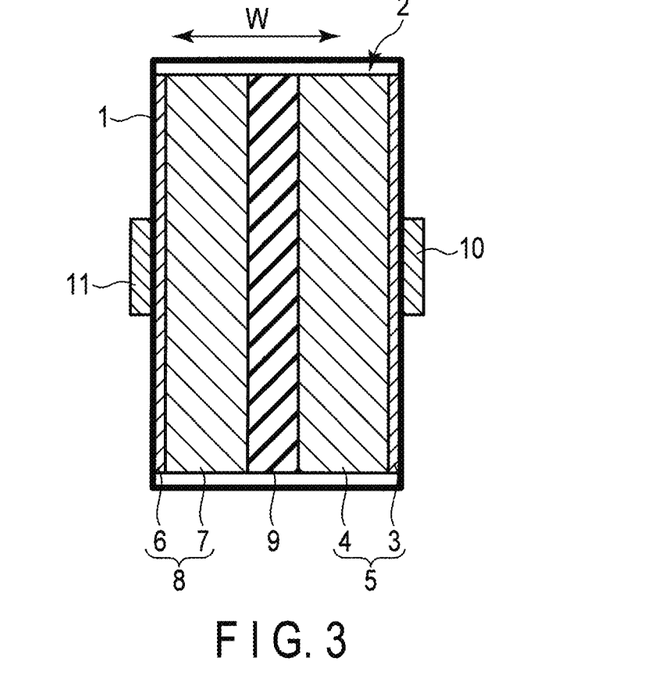
FIG. 3 is a cross-sectional view showing a solid electrolyte secondary battery according to a third embodiment.
Figure 4:
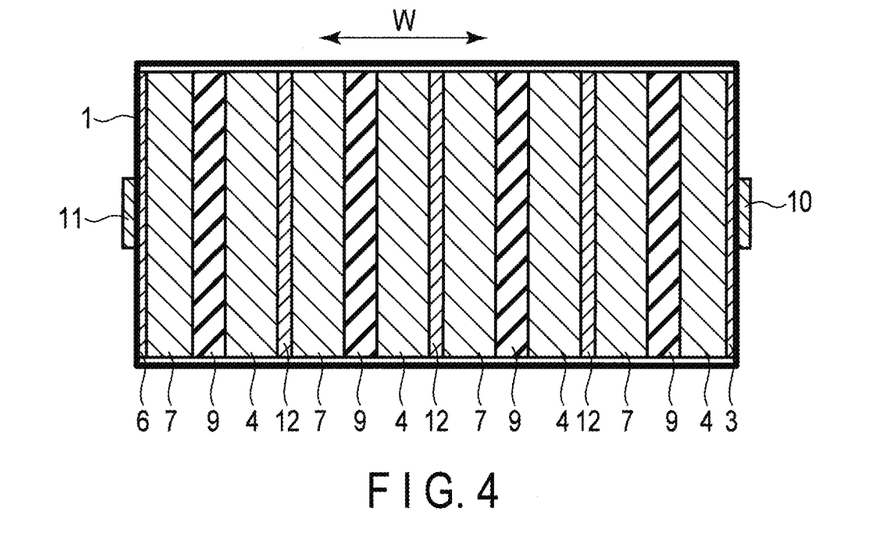
FIG. 4 is a cross-sectional view showing a bipolar battery according to the third embodiment.

The battery according to the third embodiment includes, for example, a solid electrolyte secondary battery and a bipolar battery. FIG. 3 shows an example of the thin solid electrolyte secondary battery according to the embodiment. FIG. 4 shows an example of the bipolar battery.

As shown in FIG. 3, the solid electrolyte secondary battery includes a metal container 1 and an electrode group 2 contained in the container 1. The electrode group 2 is a laminated body which includes a positive electrode 5, a negative electrode 8 and a solid electrolyte layer 9. The positive electrode 5 includes a positive electrode current collector 3 and a positive electrode material layer 4 which is laminated on the positive electrode current collector 3. The negative electrode 8 includes a negative electrode current collector 6 and a negative electrode material layer 7 which is laminated on the negative electrode current collector 6. The solid electrolyte layer 9 is arranged between the positive electrode material layer 4 and the negative electrode material layer 7. The solid electrolyte layer 9 includes a ceramic-grain sintered body in which a crystal plane having an ion conducting path is oriented in a direction W that is orthogonal to the positive electrode 5 and the negative electrode 8. The positive electrode terminal 10 is fixed to the container 1 via an insulating member (not shown), and is electrically connected with the positive electrode current collector 3. The negative electrode terminal 11 is fixed to the container 1 via an insulator (not shown), and is electrically connected with the negative electrode current collector 6. The positive electrode and the negative electrode are electrically insulated from the container 1.

As shown in FIG. 4, the bipolar battery includes plural bipolar-structure bodies in which the positive electrode material layer 4 is joined to one surface of the current collector 12 and the negative electrode material layer 7 is joined to the other surface of the current collector 12. The solid electrolyte layer 9 is arranged between the positive electrode material layer 4 and the negative electrode material layer 7. That is, one laminated body is obtained by interposing the solid electrolyte layer 9 between the plural bipolar-structure bodies. The solid electrolyte layer 9 includes a ceramic-grain sintered body including a crystal plane having an ion conducting path and oriented in the direction W that is orthogonal to the positive electrode material layer 4 and the negative electrode material layer 7. The positive electrode current collector 3 is joined to the positive electrode material layer 4 which is located on one outermost layer of the laminated body. The negative electrode current collector 6 is joined to the negative electrode material layer 7 which is located on the other outermost layer of the laminated body. The positive electrode terminal 10 is fixed to the container 1 via an insulating member (not shown), and is electrically connected with the positive electrode current collector 3. The negative electrode terminal 11 is fixed to the container 1 via an insulating member (not shown), and is electrically connected with the negative electrode current collector 6. The laminated body is electrically insulated from the container 1.

Each of the solid electrolyte battery and the bipolar battery is connected with a member of a charge/discharge circuit etc., and then is contained in a housing, both of which are available as a battery pack. The number of batteries contained in a battery pack can be one or more. When plural batteries are contained, a connection between batteries may be series or parallel.

Although the use of a battery and a battery pack using this battery is not limited in particular, for example, a vehicle such as a motor car, (or motorcycle), a bicycle, a bus, a train, etc. can be mentioned as the use.

Description will now be made on how to take out the solid electrolyte from a battery and how to confirm orientation. By scraping off the positive electrode and the negative electrode which are adjacent to the solid electrolyte layer by polishing, the solid electrolyte layer can be taken out. Surfaces, which had contacted the positive electrode and the negative electrode of the taken out electrolyte layer, are polished, and then, without grinding the sample, XRD measurement is performed using an aluminum holder with a frame shape. The solid electrolyte with the polished surface is set on the holder while ensuring that the height of a measuring surface is the same as the height of the dedicated holder of the XRD apparatus. An XRD chart produced by this measurement method is labeled as A.

Next, the same solid electrolyte as the one for which the XRD chart A has been obtained is ground until a mean particle size becomes about 5 μm. The mean particle size can be determined by laser diffractometry. Powder X-ray diffraction measurement is performed using these samples. At this time, since the position of a peak may be shifted or an intensity ratio may be changed depending on how a sample is filled, the sample is stuffed into a capillary and measurement is performed using a rotating table. With measurement performed by this method, a difference in measurement results due to different operators can be eliminated, which enables higher reproducibility. An XRD chart obtained by this measurement method is labeled as B.

A peak having the highest intensity, $I_{std}$, of A and B is regarded as a standard, and a relative intensity ratio for each peak, $I/I_{std}$, is obtained. At this time, a relative intensity ratio obtained for A and a relative intensity ratio obtained for B are compared, and when the amount of change in these relative intensity ratios is 1 percent or more, the crystal is assumed to have some form of orientation. For example, in a crystal structure having a crystal plane (ion conducting plane) which has an ion conducting path in the direction of the c-axis, when a peak assigned as the indices of a (00c) plane in a XRD chart obtained as A changes with a tendency that its relative intensity becomes strong compared to B, it can be judged that there exists an orientation to the ion conducting plane. When the peak with the highest intensity, $I_{std}$, is in agreement with the indices of the crystal plane of an orientation direction, that peak is not regarded as a standard; a peak which is other than a peak having indices relevant to the ion conducting plane and which has a strong intensity, for example, a peak which is assigned as the indices of a (a00) plane is regarded as the standard, $I_{std}$, and comparison needs to be done. In addition, in a solid electrolyte having an ion conducting plane in the direction of the b-axis, or in a solid electrolyte having an ion conducting plane in the direction of the a-axis, or in a solid electrolyte having an ion conducting plane in a {111} direction, etc., when the peak intensity ratio of indices of the crystal plane corresponding to a conducting channel is stronger than that in the result of a powder's measurement using the rotating table, it can be judged that the solid electrolyte is oriented along the conducting channel.

Confirmation of whether or not there exists an ion conducting path in a direction that intersects the surface of a solid electrolyte in the range of not more than 30° with respect to the perpendicular of one surface of the solid electrolyte can be done using a transmission electron microscope (TEM). A cross section including the surface in question is cut off by ion milling, etc., and TEM observation is performed. At this time, when lattice fringes, which intersect the surface in question at the angle of 60° to 120° (which intersect the perpendicular of the surface in question at the angle of ±30°), can be confirmed, that crystal plane is clarified using electron diffraction. With this measurement, when it can be clarified that the lattice fringes belong to those corresponding to a conducting plane (a crystal plane having an ion conducting path), it can be judged that there exists the ion conducting path in a direction which intersects the surface of the solid electrolyte at the angle of not more than 30° with respect to the perpendicular of one surface of the solid electrolyte.

Figure 5:
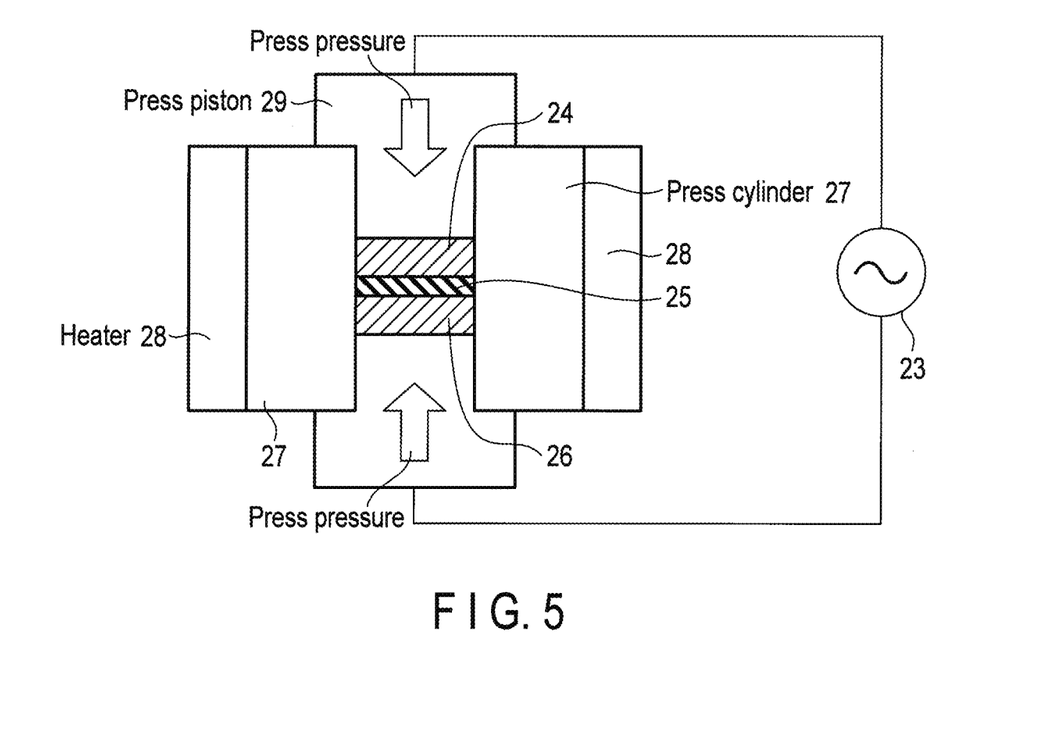
FIG. 5 is a schematic view of a press apparatus used for manufacturing a battery according to the third embodiment.

The battery of the third embodiment can be manufactured by laminating a positive electrode and a negative electrode on the solid electrolyte manufactured by the method of the second embodiment. It can also be manufactured by the following method. First, a solid electrolyte precursor is produced in a similar manner to the second embodiment. A positive electrode including the positive electrode active material and the solid electrolyte which is mixed at the ratio of 5 to 30 mass percent relative to the positive electrode active material, and a negative electrode including the negative electrode active material and the solid electrolyte which is mixed at the ratio 5 to 30 percent relative to the negative electrode active material are produced in a similar manner to the third embodiment. The solid electrolyte can be one which is different from that of the first embodiment. As shown in FIG. 5, a laminated body in which the positive electrode 24, the solid electrolyte precursor 25 and the negative electrode 26 are laminated in this order is arranged in a press cylinder 27. A heater 28 is arranged in the periphery of the press cylinder 27. Accordingly, the laminated body is heated by the heater 28. A press piston 29 connected with an alternating power source 23 is inserted into the press cylinder 27, and with the laminated body sandwiched by the press piston 29, a press pressure and an alternating electric field are applied from both sides of the laminated body. With this process, since hot pressing is provided while applying the alternating electric field to the laminated body, an ion conducting path in the positive electrode, the solid electrolyte and the negative electrode can be formed uniformly, and so the resistance of a whole solid-state battery can be decreased.

According to the battery and the battery pack of the third embodiment described above, since an electrolyte including a ceramic-grain sintered body which includes a crystal plane having an ion conducting path is oriented in a direction that may intersect the positive electrode and the negative electrode is used, ion diffusion velocity and ion conduction in the positive electrode, the electrolyte layer and the negative electrode can be improved. Consequently, a battery and a battery pack with improved charge/discharge performance including rate performance can be realized.

EXAMPLES

Embodiments will be described in more detail below based on the Examples.
<Synthesis of Solid Electrolyte Layer>

Example 1

A perovskite-type solid electrolyte represented by $La_{0.56}Li_{0.33}TiO_3$ was synthesized, and a solid electrolyte layer using this was produced. $La_2O_3$, $Li_2CO_3$, and $TiO_2$ which are commercial reagents were used. These powders were weighed so that a prescribed molar ratio may be obtained, and mixing and grinding were performed in ethanol for 1 hour by a planetary ball mill (300 rpm/zirconia ball). Next, the powder was put into an electric furnace and was calcined at 800° C. for 12 hours. After mixing this powder again, uniaxial pressure molding was performed to form a pellet form with the thickness of 1 mm and the diameter of 12 mm. Next, after both surfaces of a pellet were smoothed by polishing, platinum electrodes were vapor-deposited. While an alternating electric field at 0.5 V with the frequency of 1 Hz was being applied between these electrodes from the outside, sintering was performed at 1350° C. for 2 hours in air. Alternating-current-impedance measurement was performed on the sintered sample in the range of 5 Hz to 13 MHz under dry argon circulation, and lithium-ion conductivity at 25° C. was measured. After the alternating-current-impedance measurement, in order to confirm orientation, XRD measurement was performed with the sample set on the aluminum holder, after the platinum electrodes on the surfaces of the pellet were removed by polishing. Next, after the pellet was ground, XRD measurement was performed with the sample set on the rotating table. Consequently, when the (110) plane, which corresponds to a main peak, is regarded as a standard, a difference was observed in the peak of the (001) plane along the c-axis between before and after the grinding. In the pellet state, the amount of change in the relative intensity ratio of a peak corresponding to the (001) plane was found to be stronger by about 18 percent, and it was confirmed that there existed an orientation in the direction of the c-axis. Although a perovskite-type oxide has a three-dimensional diffusion route, it was proved that a lattice oriented in the direction of the c-axis was generated by applying an electric field from the outside while heating.

Example 2

A garnet-type solid electrolyte represented by $Li_7La_3Zr_2O_{12}$ was synthesized, and a solid electrolyte layer using this was produced. A starting material was weighed so that a stoichiometric ratio may be obtained, and mixing and grinding were performed in ethanol for 1 hour by planetary ball mill using a zirconia ball at 300 rpm. After the powder mixture of the starting material was separated from the balls and ethanol, it was put into a crucible made of $Al_2O_3$ and was calcined at 950° C. for 10 hours in an air atmosphere. Then, this powder was ground again, and the obtained powder was calcined again at 950° C. for 10 hours under the condition of an air atmosphere. Then, uniaxial pressure molding was performed to form a pellet form with the thickness of 1 mm and the diameter of mm. Next, after both surfaces of a pellet were smoothed by polishing, platinum electrodes were vapor-deposited. While an alternating electric field of 0.5 V with the frequency of 1 Hz was being applied between these electrodes from the outside, primary sintering was performed at 1200° C. for 12 hours under the condition of an air atmosphere. Alternating-current-impedance measurement was performed on the sintered sample in the range of 5 Hz to 13 MHz under dry argon circulation, and the lithium-ion conductivity at 25° C. was measured. After the alternating-current-impedance measurement, in order to confirm orientation, XRD measurement was performed with the sample set on the aluminum holder, after the platinum electrodes on the surfaces of the pellet were removed by polishing. Next, after the pellet was ground, XRD measurement was performed with the sample set on the rotating table. Consequently, when the (220) plane is regarded as a standard, a difference was observed in the peak of the (024) plane along a conducting path between before and after the grinding. In the state of the pellet, the peak of the (024) plane was found to be stronger by about 6 percent, and it was confirmed that there existed orientation along the conducting path. Even in the case of a garnet-type oxide in which a two-dimensional diffusion route is arranged three-dimensionally, it has been successfully confirmed that a crystal plane having an ion conducting path is oriented in a direction perpendicular to both surfaces of the solid electrolyte layer by applying an electric field from the outside while heating.

Production of All-Solid-State Battery of Example 3

The all-solid-state battery of an Example 3 was manufactured by the following method, using the solid electrolyte layer of the Example 2. The solid electrolyte powder of $Li_7La_3Zr_2O_{12}$ synthesized by a publicly known method was ground until a mean particle size became 1 μm. The positive electrode was produced by mixing the obtained solid electrolyte powder with commercial lithium-cobalt oxide ($LiCoO_2$) at the ratio of 30 mass percent relative to $LiCoO_2$ and by forming a powder mixture into a pellet form. The negative electrode was produced by mixing the solid electrolyte powder of $Li_7La_3Zr_2O_{12}$ with commercial lithium titanate ($Li_4Ti_5O_{12}$) at the ratio of 30 mass percent relative to $Li_4Ti_5O_{12}$.

As shown in FIG. 5, an alternating electric field of 1 Hz with the voltage of 3 V was applied to a laminated body in which a positive electrode, the solid electrolyte of the Example 2 and a negative electrode are laminated in this order, and simultaneously by pressurizing the laminated body at the pressure of 2.5 ton/cm$^2$ while heating at 800° C. for 12 hours using a hot press with a diameter of 10 mm, the all-solid-state battery of the Example 3 was obtained. With this process, the ion conducting path of the whole of the positive electrode, the electrolyte and the negative electrode was uniformly formed.

By charging the all-solid-state battery of the Example 3 at the charge rate of 0.01 C and by discharging the same at the discharge rate of 0.01 C, a reference capacity was measured. Next, by charging the all-solid-state battery at the charge rate of 0.01 C and by discharging the same at the discharge rate of 0.05 C, a discharge capacity was measured. As shown in Table 2, an obtained discharge capacity is expressed as a capacity maintenance rate at 0.05-C discharge where the reference capacity is assumed as 100 percent.

Synthesis of Solid Electrolyte Layer of Comparative Examples 1 and 2

The solid electrolyte layer of Comparative Examples 1 and 2 was manufactured in a similar manner to the Examples 1 and 2 except that synthesis was performed without applying an alternating electric field at the time of sintering. When XRD measurement was performed on each solid electrolyte layer of the comparative examples 1 and 2, no difference was observed between the measurement result of a pellet state and the measurement result of a powder state, and so it has been proved that there exists no orientation.

Production of All-Solid-State Battery of Comparative Example 3

The all-solid-state battery of Comparative Example 3 was obtained in a similar manner to the Example 3 except that the solid electrolyte layer of the Comparative Example 2 was used and that an alternating electric field was not applied at the time of the hot press. The capacity maintenance rate, at 0.05-C discharge, of the all-solid-state battery of the comparative example 3 is shown in Table 2 below.

The lithium-ion conductivity obtained from the alternating-current-impedance measurement of these Examples and the Comparative Examples, and the capacity maintenance rate of the all-solid-state battery when discharge was performed at the discharge rate of 0.05 C, are shown in Table 1 and Table 2.

TABLE 2

| | Battery configuration Positive electrode/solid electrolyte/negative electrode | Application of alternating electric field during hot-pressing | Capacity maintenance rate at 0.05 C discharge |
|---|---|---|---|
| Example 3 | LiCoO$_2$/Li$_7$La$_3$Zr$_2$O$_{12}$/Li$_4$Ti$_5$O$_{12}$ | Yes | 62.3% |
| Comparative Example3 | LiCoO$_2$/Li$_7$La$_3$Zr$_2$O$_{12}$/Li$_4$Ti$_5$O$_{12}$ | No | 31.5% |

This result shows that the solid electrolyte of the Examples 1 and 2 exhibits higher lithium-ion conductivity compared to that of the solid electrolyte of the Comparative Examples 1 and 2. In particular, since the decrease of grain boundary resistance is effective, it has been proved that the decrease of grain boundary resistance is possible for an all-solid-state battery including a powder that can be synthesized at a low cost. Capacity maintenance rates are shown in Table 2 for the all-solid-state batteries of the Example 3 and the Comparative Example 3. The capacity maintenance rate was obtained by comparing the discharge capacity where charging was performed at 0.01 C and discharging was performed at 0.05 C to the reference capacity where charge and discharge capacity in the case of 0.01 C. As is clear from this result, the discharge capacity maintenance rate of the battery of the Example 3 is higher compared to that of the battery of the comparative example 3. By performing a hot press while applying an external alternating electric field, a path through which a lithium ion easily conducts is generated not only in the solid electrolyte layer but also between the electrode active material and the solid electrolyte, and so grain boundary resistance can be decreased as a result. Accordingly, an all-solid-state battery with excellent rate performance can be obtained.

A technique was shown in the Example, where an electrolyte layer was synthesized in advance and a coupling between grains is promoted by re-sintering a laminated body in which a positive electrode and a negative electrode are laminated on the electrolyte layer; however, a similar effect can be obtained using another technique, where a laminated body is produced by press-molding a mixture that includes the raw constituent materials of a positive electrode, a negative electrode, a solid electrolyte, etc., and while the positive electrode, the negative electrode and the solid

TABLE 1

| | Composition | Crystal phase | Bulk conductivity $\sigma_b$/Scm$^{-1}$ | Sum of bulk conductivity and grain boundary conductivity $\sigma_{b+gb}$/Scm$^{-1}$ | Difference in change of relative peak intensity ratio I/I$_{std}$ between pellet and ground particle | Indices of crystal plane relevant to orientation |
|---|---|---|---|---|---|---|
| Example 1 | La$_{0.56}$Li$_{0.33}$TiO$_3$ | Perovskite | 1.31 × 10$^{-3}$ | 7.85 × 10$^{-6}$ | Yes | (001) |
| Example 2 | Li$_7$La$_3$Zr$_2$O$_{12}$ | Garnet | 6.05 × 10$^{-5}$ | 5.15 × 10$^{-7}$ | Yes | (024) |
| Comparative Example 1 | La$_{0.56}$Li$_{0.33}$TiO$_3$ | Perovskite | 1.02 × 10$^{-3}$ | 1.56 × 10$^{-6}$ | No | — |
| Comparative Example 2 | Li$_7$La$_3$Zr$_2$O$_{12}$ | Garnet | 4.11 × 10$^{-5}$ | 6.42 × 10$^{-8}$ | No | — | electrolyte are simultaneously being reacted by sintering, an alternating electric field is applied from the outside.

In addition, although a crystalline solid electrolyte was used in the Example, the solid electrolyte is not limited to a crystalline one; even for a material such as an amorphous-like sulfide system and a phosphate glass system in which a conducting path is not clear in terms of a crystal structure, a similar effect can be obtained when the sintered body of ceramic grains is included in the solid electrolyte.

Although a green compact was used as the positive electrode, the solid electrolyte and the negative electrode in the Example, the method used is not limited to this one; a method generally used for producing a solid electrolyte such as a method in which a positive electrode and a negative electrode are coated on or pressure-joined to a solid electrolyte, various kinds of spin coat method, a PVD method, etc. can also be used.

According to the solid electrolyte of at least one embodiment or one Example described above, since a ceramic-grain sintered body in which a crystal plane having an ion conducting path is oriented in a direction that may intersect at least one surface of the solid electrolyte is included, there can be provided a solid electrolyte that exhibits high ion conduction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for manufacturing a solid electrolyte comprising:
    applying an alternating electric field in a direction which intersects at least one surface of a solid electrolyte precursor comprising a ceramic-grain sintered body comprising a crystal plane having an ion conducting path, while heating the solid electrolyte precursor, thereby orienting the crystal plane.

2. The method according to claim 1, wherein the applying the alternating electric field further comprises:
    arranging the solid electrolyte precursor between platinum electrodes; and
    sintering the solid electrolyte precursor while applying the alternating electric field between the platinum electrodes.

3. The method according to claim 1, wherein a voltage of the alternating electric field falls within a range of 0.1 V to 5.0 V.

4. The method according to claim 3, wherein a frequency of the alternating electric field falls within a range of 10 mHz to 10 MHz.

5. The method according to claim 1, wherein the solid electrolyte is a perovskite-type solid electrolyte or a garnet-type solid electrolyte.

6. The method according to claim 1, wherein the crystal plane is oriented in a direction which intersects at least one surface of the solid electrolyte.

7. The method according to claim 6, wherein the direction intersects the at least one surface of the solid electrolyte in a range of not more than 30° with respect to a perpendicular of the at least one surface of the solid electrolyte.

8. The method according to claim 6, wherein the crystal plane is oriented in a direction which perpendicularly intersects the at least one surface of the solid electrolyte.

9. The method according to claim 1, wherein the ceramic-grain sintered body has lithium-ion conduction.

10. The method according to claim 1, wherein the applying the alternating electric field further comprises:
    arranging the solid electrolyte precursor between a positive electrode and a negative electrode to obtain a laminated body; and
    sintering the solid electrolyte precursor while applying hot pressing and the alternating electric field to the laminated body.

* * * * *